(12) United States Patent
Milton

(10) Patent No.: US 7,171,114 B2
(45) Date of Patent: Jan. 30, 2007

(54) MIRROR-MIMICKING VIDEO SYSTEM

(76) Inventor: Curtis A. Milton, P.O. Box 158, Bristol, FL (US) 32321

(*) Notice: Subject to any disclaimer, the term of this patent is extended or adjusted under 35 U.S.C. 154(b) by 358 days.

(21) Appl. No.: 10/889,642

(22) Filed: Jul. 12, 2004

(65) Prior Publication Data

US 2006/0007303 A1 Jan. 12, 2006

(51) Int. Cl.
*G03B 41/00* (2006.01)
*G03B 15/00* (2006.01)
*H04N 7/18* (2006.01)

(52) U.S. Cl. .................. 396/287; 396/419; 348/77; 348/333.01

(58) Field of Classification Search ............. 396/287, 396/419; 348/77, 333.01; 248/176.1, 176.3, 248/917–924
See application file for complete search history.

(56) References Cited

U.S. PATENT DOCUMENTS

| | | | |
|---|---|---|---|
| 3,044,187 A | 7/1962 | Nicholls, Jr. | |
| 4,807,163 A | 2/1989 | Gibbons | |
| 4,991,005 A | 2/1991 | Smith | |
| 5,469,271 A * | 11/1995 | Hoshino et al. | 386/118 |
| 5,537,175 A | 7/1996 | Kamaya et al. | |
| 6,034,698 A | 3/2000 | Yasuda | |
| 6,414,708 B1 * | 7/2002 | Carmeli et al. | 348/42 |
| 2003/0042772 A1 * | 3/2003 | Park | 297/217.1 |
| 2004/0114034 A1 * | 6/2004 | Squilla et al. | 348/66 |

* cited by examiner

*Primary Examiner*—W. B. Perkey
(74) *Attorney, Agent, or Firm*—John Wiley Horton (57) ABSTRACT

A system for allowing a person to observe herself or himself from different vantage points while carrying out operations such as grooming. A swivel seat is employed. A video monitor is mounted to swivel in unison with the swivel seat. Adjustment means are provided to allow the user to position the video monitor at a desired elevation and orientation. A video camera is mounted on a stand and positioned to observe the user. The video monitor displays what is seen by the video camera. Automated zoom and pan controls optionally allow the user to control the video camera from the video monitor. A hand-held version of the video monitor, which also incorporates the camera controls, is provided. A version using a hand-held video camera is disclosed as well.

20 Claims, 9 Drawing Sheets

FIG. 9

MIRROR-MIMICKING VIDEO SYSTEM

BACKGROUND OF THE INVENTION

1. Field of the Invention

This invention relates to the field of visual monitoring devices. More specifically, the invention comprises a camera mount and video monitor allowing a user to observe herself or himself from varying vantage points while performing common activities such as grooming.

2. Description of the Prior Art

Conventional mirrors have been used as a grooming aid for many years. Vanity mirrors are commonly used for this purpose, with the user sitting on a stool or chair before the mirror. The user carries out grooming operations (blow drying the hair, applying makeup, etc.) while watching his or her reflection. Hand-held mirrors are also used for this purpose.

Mirrors only allow the user a limited view, since the user must obviously be looking into the mirror. This limited view causes mistakes in grooming operations such as styling the hair. It is desirable for the user to be able to observe the grooming operation from the side or even the back. Multiple mirrors can achieve this objective, but are cumbersome to place and use.

The modern availability of video cameras offers a more refined solution. A video camera can be directed toward the user by placing it atop a prior art tripod. A television monitor could then be placed on a counter so that the user could see the image. Such a system does allow observation from different vantage points. However, it is not easy to change the vantage point during use. The user must remain in one position in order to remain within the camera's field of view and must be able to observe the monitor. These restriction do not allow the user to move freely. A device offering more flexibility is desirable.

BRIEF SUMMARY OF THE INVENTION

A system for allowing a person to observe herself or himself from different vantage points while carrying out operations such as grooming. A swivel seat is employed. A video monitor is mounted to swivel in unison with the swivel seat. Adjustment means are provided to allow the user to position the video monitor at a desired elevation and orientation.

A video camera is mounted on a stand and positioned to observe the user. The video monitor displays what is seen by the video camera. Automated zoom and pan controls optionally allow the user to control the video camera from the video monitor. A hand-held version of the video monitor, which also incorporates the camera controls, is provided. A version using a hand-held video camera is disclosed as well.

REFERENCE NUMERALS IN THE DRAWINGS

| 10 | stand | 12 | mounting head |
| 14 | video camera | 16 | chair |
| 18 | base | 20 | swivel seat |
| 22 | monitor | 24 | monitor mount |
| 26 | upper pivot | 28 | upper pivot lock |
| 30 | slide joint | 32 | slide joint lock |
| 34 | lower pivot | 36 | lower pivot lock |
| 38 | upright | 40 | bracket |
| 42 | beam anchor | 44 | adjustable column |
| 46 | lock | 48 | stalk |
| 50 | pivot | 52 | ball and socket joint |
| 54 | lock | 56 | hand-held camera |
| 58 | strap | 60 | lens |
| 62 | body | 64 | video feed |
| 66 | alternate monitor | 68 | display |
| 70 | handle | 72 | zoom control |
| 74 | pan control | 76 | zoom/pan stand |
| 78 | elevation drive | 80 | mast |
| 82 | pan drive | 84 | housing |
| 86 | conventional stool | 88 | pitch drive |
| 90 | pitch control | 92 | second video camera |
| 94 | alternate bracket | 96 | monitor holder |
| 98 | beam | 100 | light |
| 102 | tray | | |

DETAILED DESCRIPTION OF THE INVENTION

Figure 1:
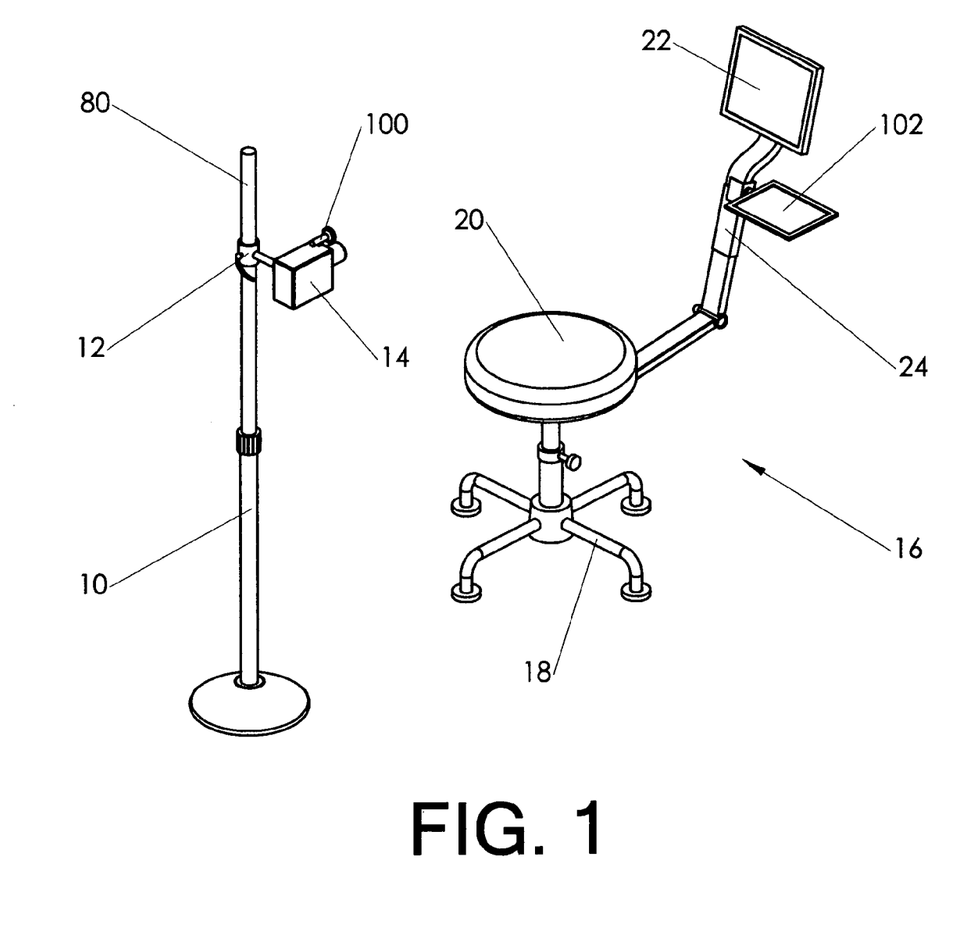
FIG. 1 is a perspective view, showing the present invention.

FIG. 1 shows the present invention assembled for use. Stand 10 mounts a prior art video camera 14. The camera is actually attached to mounting head 12, which clamps to extendable mast 80. The mounting head allows the camera to slide up and down the mast. It also allows the camera to be reoriented so that it can point in practically any desired direction.

Chair 16 is a conventional prior art device having a base 18 and pivotally mounted swivel seat 20. Swivel seat 20 is free to rotate about a vertical axis with the user in a sitting position. Monitor 22 is attached to chair 16 by monitor mount 24. Monitor mount 24 is attached so that it rotates with swivel seat 20.

Monitor mount 24 may optionally include a tray 102. Tray 102 provides a flat surface—preferably with a retaining lip around its edges—for the convenient placement of brushes, cosmetics, and similar items. It can be made an integral part of the monitor. It can also be made detachable so that the user can lock it in place or store it remotely when it is not needed.

Monitor 24 is attached via communications means to video camera 14. It displays the image "seen" by the video camera. One use suitable for the present invention is personal grooming, such as hairstyling. To perform this function, the user would typically sit on swivel seat 20 with his or her legs straddling monitor mount 24. Monitor 22 is preferably adjusted to be roughly at eye level, or in any other desired position. The user then swivels around to face video camera 14. The position and orientation of the video camera is then adjusted so that it is aimed at the user's head (for the hairstyling operation). The adjustment is made by observing the image on the monitor. The camera optionally includes a light 100, which is pointed in the same direction as the camera lens. It provides adequate lighting.

As the user rotates swivel seat 20, monitor 22 is rotated to remain in front of the user. Video camera 14 will remain pointed at the user throughout the rotation. Thus, by rotating swivel seat 20, the user can observe himself or herself from any desired angle. The use of monitor mount 24 leaves both the user's hands free. Two-handed operation, such as using a brush and blow dryer, are thereby made possible.

Figure 2:
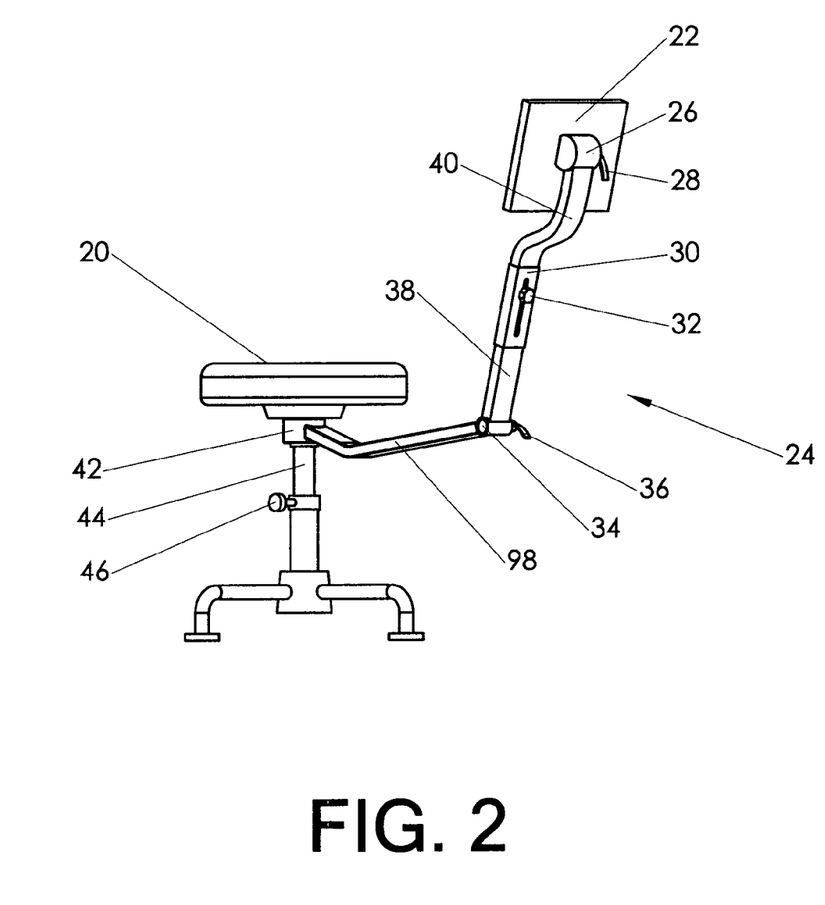
FIG. 2 depicts the chair employed in more detail.

FIG. 2 shows more details of monitor mount 24 and monitor 22. The chair employed preferably (but not necessarily) includes an adjustable column 44, the extension of which is fixed by lock 46. This prior art feature can be used to adjust the height of the chair. Beam 98 is attached to the rotating portion of the chair by any suitable means, such as by beam anchor 42.

Beam 98 extends out a distance to lower pivot 34. This feature pivotally attaches upright 38 to beam 98, allowing the adjustment of the angle between the two members. Lower pivot lock 36 locks the two members together when the desired angle is set.

Upright 38 is actually comprised of two slidably connected portions, with the upper portion being labeled as bracket 40. The upright contains a slide joint 30 which allows the overall length of the upright to be adjusted. Slide joint lock 32 allows the length to be set once it is properly adjusted.

Monitor 22 is connected to bracket 40 by upper pivot 26. The upper pivot allows the pitch of the monitor to be adjusted to a desired angle, then locked in place by turning upper pivot lock 28. The reader will observe that bracket 40 includes a dogleg offset in the direction away from the user's seated position. This is an optional feature, but it is preferable. The dogleg offset allows the monitor to be positioned further away from the user, while keeping the lower portions of the monitor mount close to the user (thereby allowing the user to pivot the seat without the lower portions of the monitor mount striking nearby objects).

The combination of the multiple adjustment features included in the monitor mount allow a user to position the monitor according to his or her tastes. The design can accommodate a wide variety of user sizes and shapes.

The video signal can be fed from the camera to the monitor by a variety of prior art devices. The most common is a simple coaxial cable. A wireless transmitter (proximate the camera) and wireless receiver (proximate the monitor) can also be used.

Figure 3:
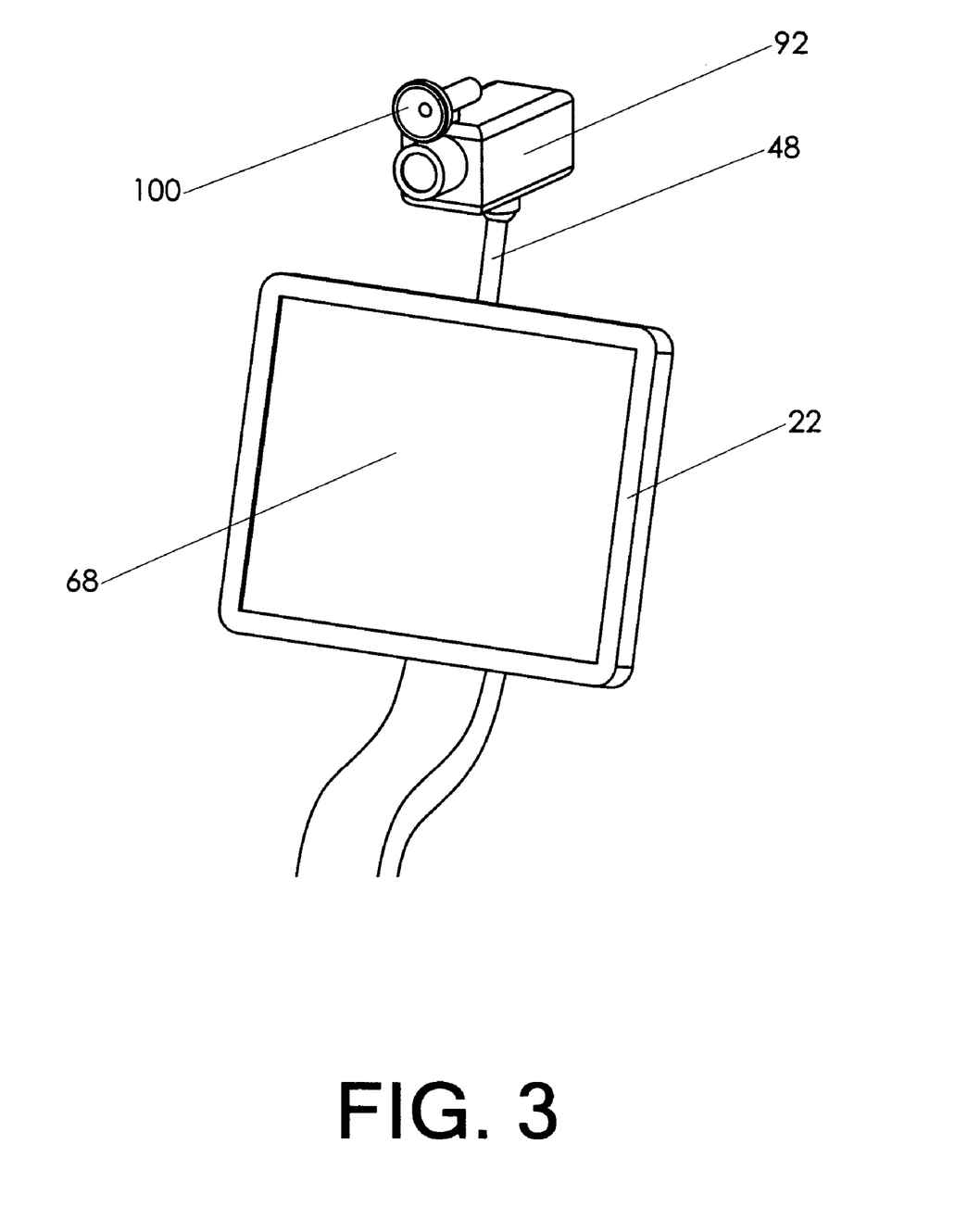
FIG. 3 is a detail view, showing a monitor with an attached video camera.

It is also possible to employ more than one camera. FIG. 3 is a detail view of monitor 22. A second camera, denoted as second video camera 92 can be attached to the monitor itself, in this case via stalk 48. The monitor incorporates display 68, which actually displays the video image. A relatively thin monitor is preferable (meaning that cathode-ray types are not preferred). Video control electronics can be incorporated in the monitor, so that it can display more than one image at a time. As an example, a "split screen" display can be shown, with one image coming from video camera 14 and a second image coming from second video camera 92 (which can also be equipped with a light 100). This feature would allow the user to see a conventional frontal view while also seeing a view from another angle.

Figure 4:
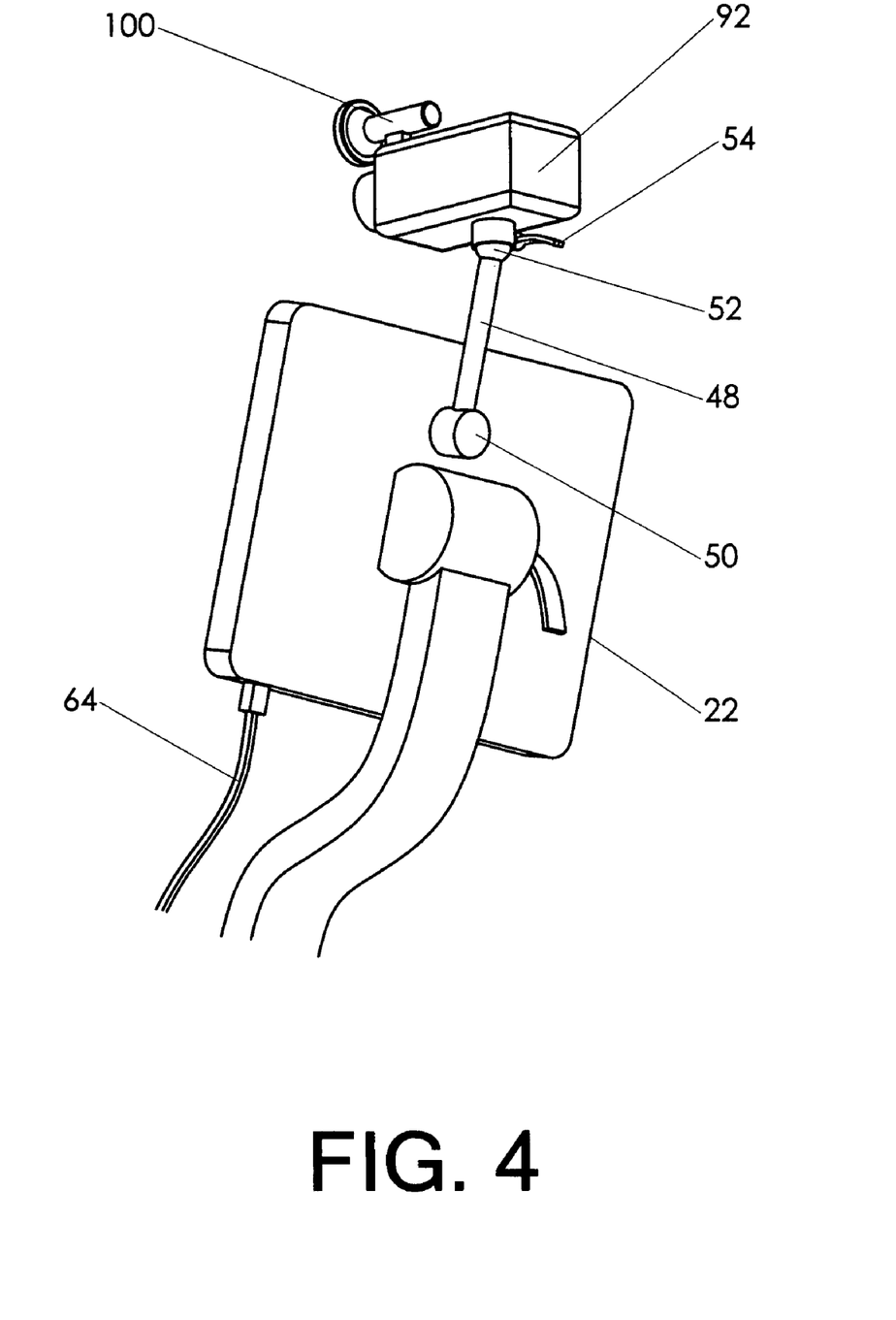
FIG. 4 is a detail view, showing some of the mounting methods used for the monitor.

FIG. 4 shows the mounting of second video camera 92 on the rear of monitor 22. Stalk 48 is attached via pivot 50. Second video camera 92 is attached to stalk 48 by ball and socket joint 52 (locked in place by lock 54). These features allow the position and orientation of second video camera 92 to be adjusted. FIG. 4 also shows the attachment of a cable to the monitor—designated as video feed 64.

Figure 5:
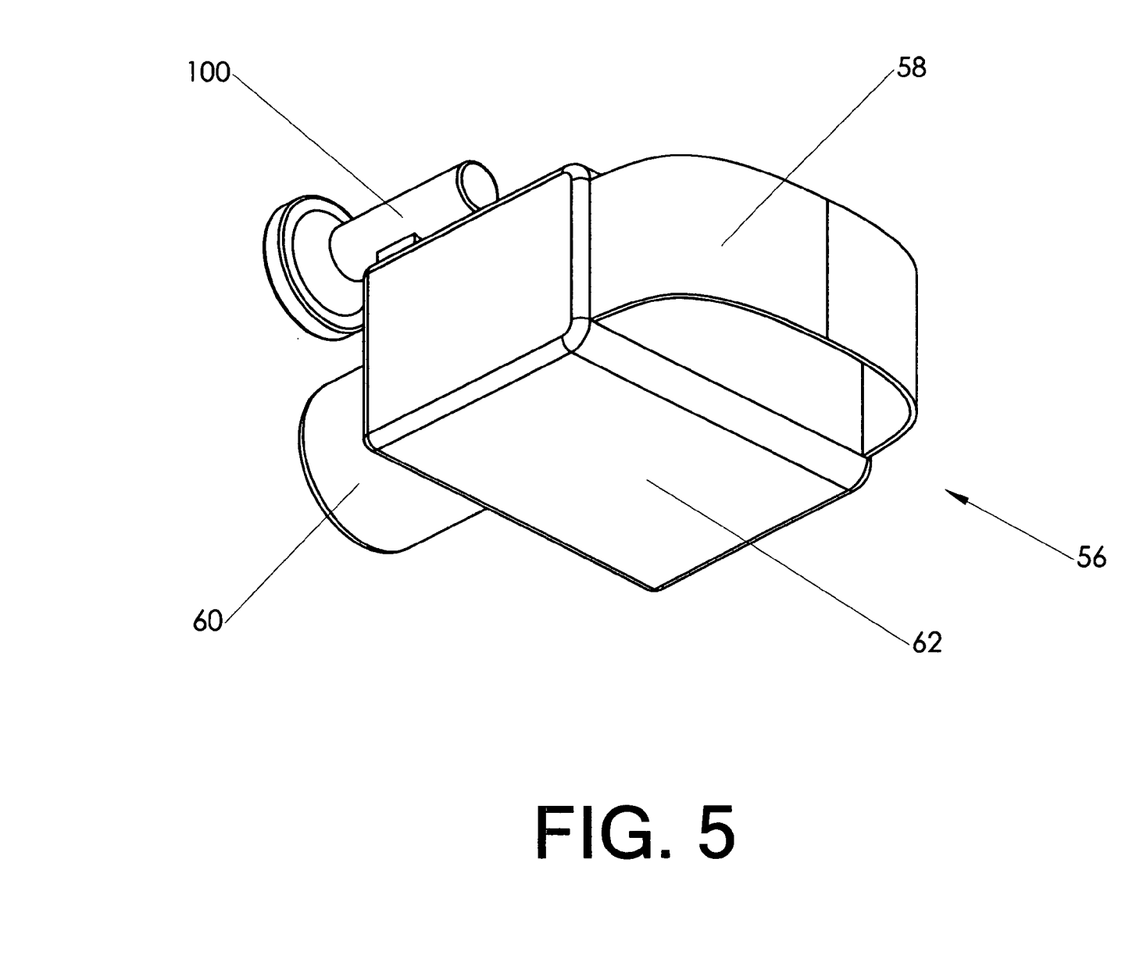
FIG. 5 is a perspective view, showing a hand-held video camera.

The invention can be used with many types of camera mounts. The configuration shown in FIG. 1 is good in that it leaves both the user's hands free. In some instances, however, the user may wish to use one hand to hold the video camera manually. FIG. 5 shows hand-held camera 56. It features a body 62 and lens 60. Strap 58 is provided so that a user can pass his or her hand between body 62 and strap 58, thereby easily holding the camera. The user can then quickly manipulate the camera while watching the view on monitor 22.

Figure 6:
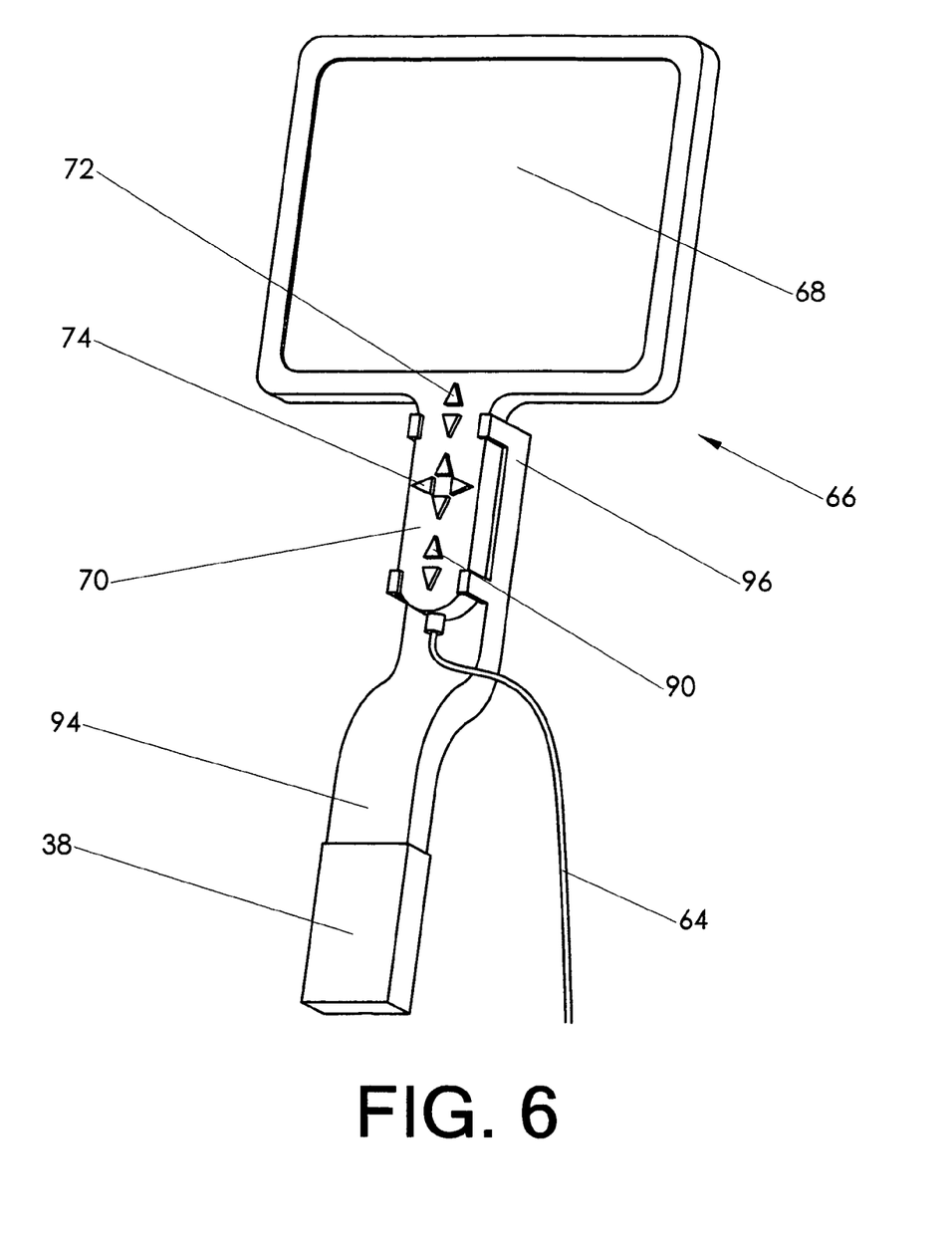
FIG. 6 is a perspective view, showing a hand-held monitor.

A hand-held version of the monitor is also possible. FIG. 6 shows alternate monitor 66. Handle 70 extends downward from the portion containing display 68. Handle 70 slides into monitor holder 96, which is attached to alternate bracket 94. Alternate bracket 94 is a substitute for bracket 40. Thus, it can attach alternate monitor 66 to a chair so that it pivots in the same fashion as monitor 22. However, the user can also remove alternate monitor 66 from alternate bracket 94. It can then be held by handle 70, in much the same fashion as a prior art hand mirror.

Figure 7:
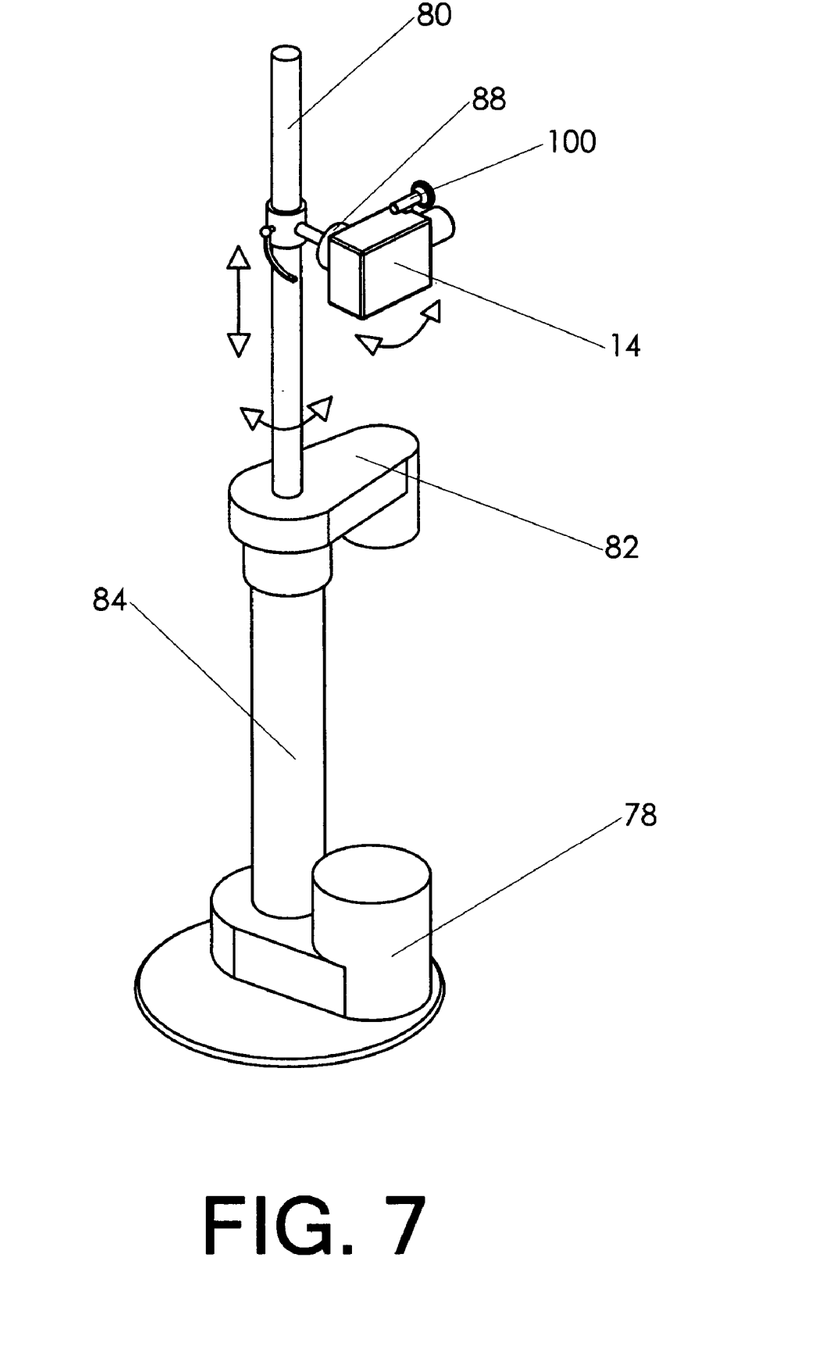
FIG. 7 is a perspective view, showing a camera stand having panning features.

The functions of positioning video camera 14 can be automated. FIG. 7 shows zoom/pan stand 76. It features several drive motors which control the position and orientation of the video camera. Elevation drive 78 extends and retracts mast 80 with respect to housing 84, thereby adjusting the elevation of the camera. Pan drive 82 rotates mast 80 (with the camera attached) around a vertical axis. Pitch drive 88 can also be provided. It pitches the camera up and down. The camera itself can be equipped with a zoom lens (common in the prior art). This controls the magnification of the video image.

All these features are preferably controlled from the monitor. Returning to FIG. 6, the reader will observe a series of buttons on handle 70. Zoom control 72 allows the user to zoom in and out. Pan control 74 allows the user to pan the camera left and right(actually rotating the mast using pan drive 82), as well as up and down (using elevation drive 78). Pitch control 90 controls pitch drive 88 in order to pitch the video camera downward or upward. A switch can also be included to control light 100.

Figure 9:
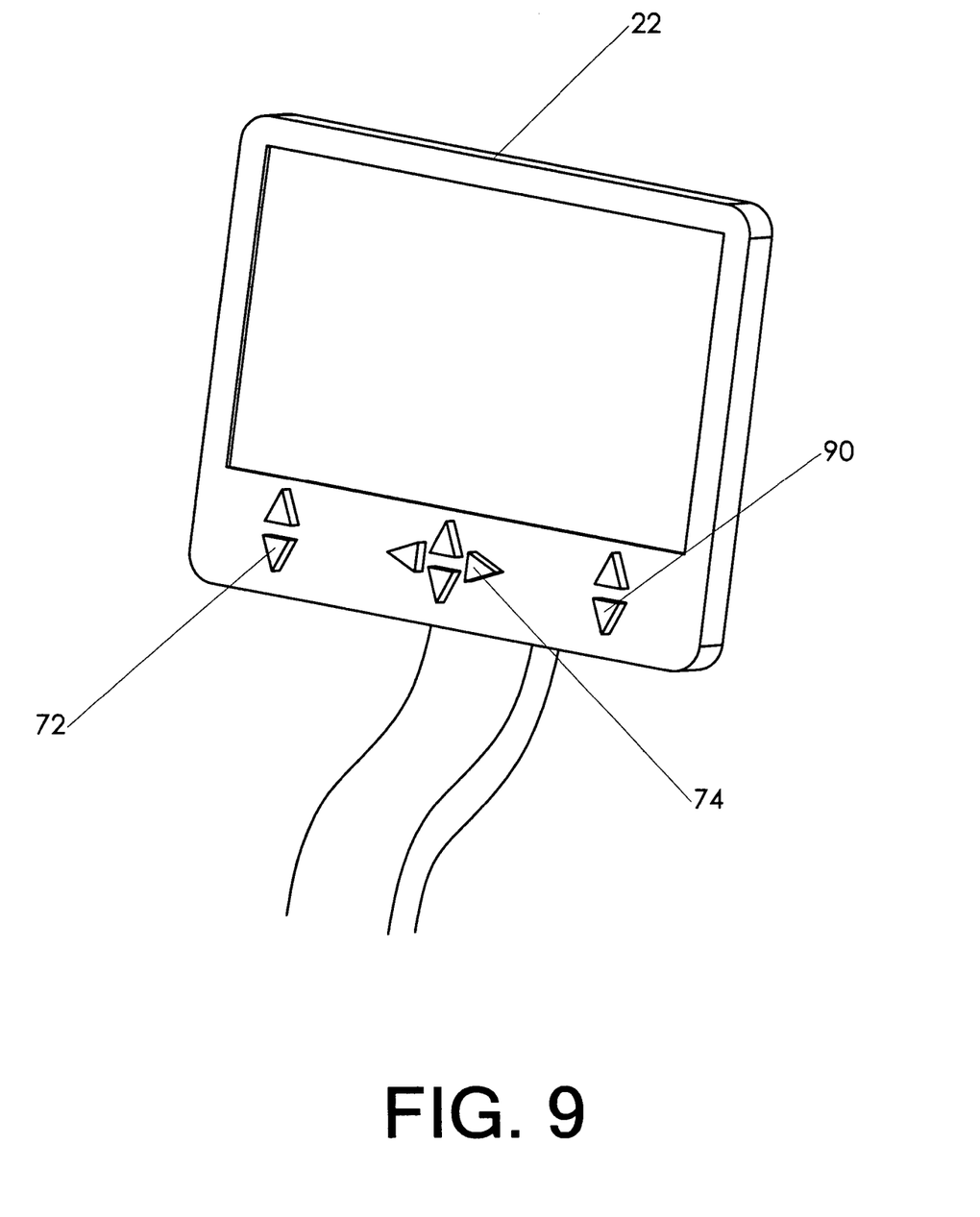
FIG. 9 is a detail view, showing control features on the monitor.

Such controls are not limited to the hand-held type of monitor. FIG. 9 shows monitor 22 with similar controls added (zoom control 72, pan control 74, and pitch control 90). The user can easily reach out and press these controls while sitting in the chair. Those skilled in the art will know that such controls could be provided via a touch screen as part of the video display itself. A pointing device (such as a mouse or touch pad commonly found on laptop computers) could also be used.

Figure 8:
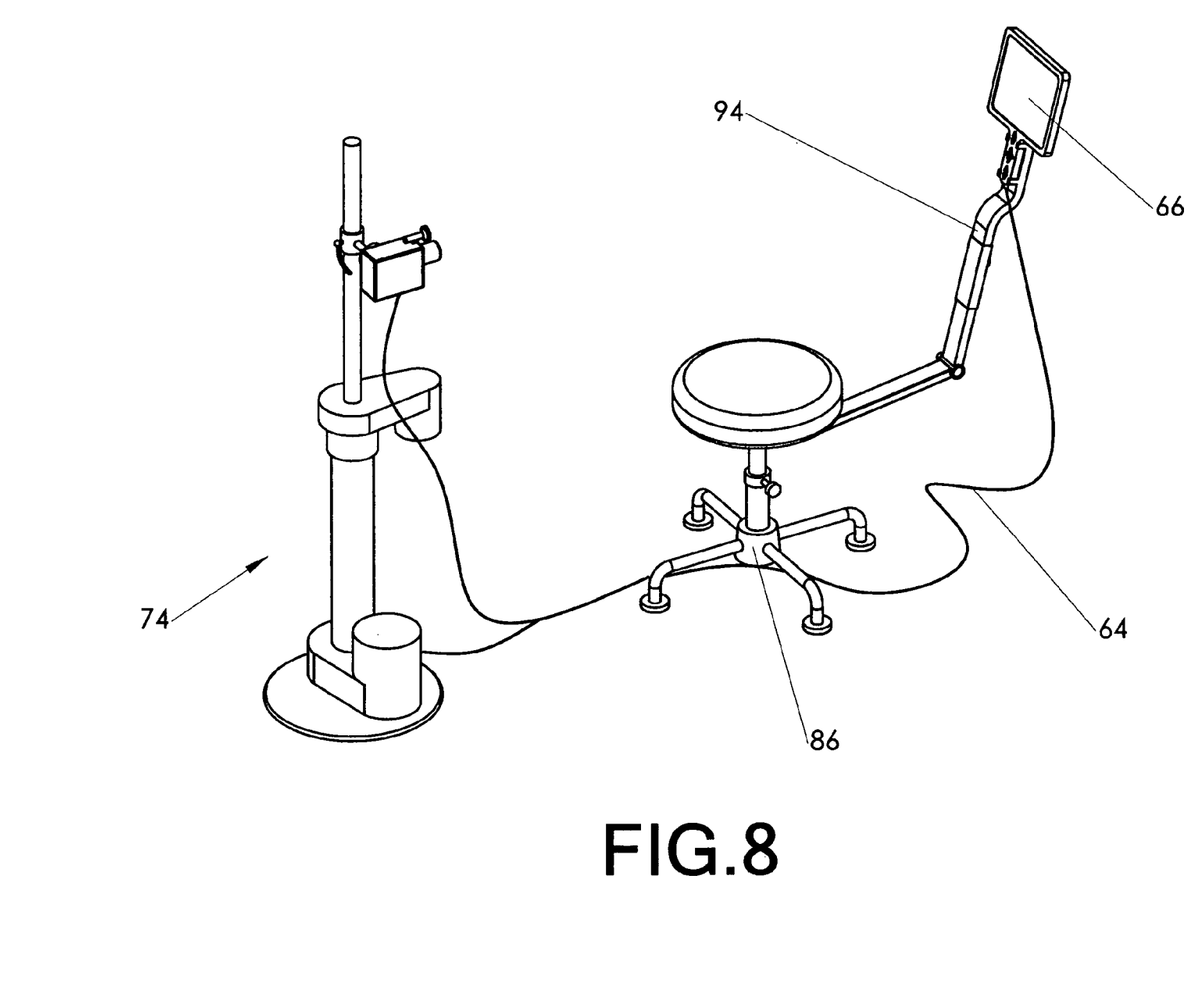
FIG. 8 is a perspective view, showing the invention assembled for operation.

FIG. 8 shows the embodiment featuring alternate monitor 66 assembled for use. Zoom/pan stand 76 allows the automation of the camera functions. The video camera and monitor are linked via video feed 64. Additional circuits can be added to this cable to transmit the control signals (zoom, pan, etc.) to the camera. The control signals can also be transmitted via a wireless transmitter and receiver.

Although the preceding description contains significant detail, it should not be construed as limiting the scope of the invention but rather as providing illustrations of the preferred embodiments of the invention. Thus, the scope of the invention should be fixed by the following claims, rather than by the examples given.

Having described my invention, I claim:

1. A monitor system allowing a user to observe himself or herself while seated in a chair having a base and a seat pivotally attached to said base, comprising:
   a. a video camera;
   b. camera mounting means for fixing the location and orientation of said video camera, so that said video camera can be pointed toward said user when said user is sitting on said seat;
   c. a monitor, including
      i. communications means for receiving a video signal from said video camera;
      ii. display means for displaying said video signal as a visible image;
   d. monitor mounting means, configured to attach said monitor to said chair, so that said monitor pivots in unison with said seat; said monitor mounting means including
      i. a beam linked to said seat so as to pivot in unison with said seat;
      ii. an upright, extending upward from said beam; and
      iii. an attachment between said upright and said monitor.

2. A monitor system as recited in claim 1, further comprising:
   a. a lower pivot connecting said upright to said beam so that said upright can pivot with respect to said beam; and
   b. a lower pivot lock for locking said lower pivot in a desired position.

3. A monitor system as recited in claim 1, further comprising:
   a. a slide joint within said upright for adjusting the length of said upright; and
   b. a slide joint lock for locking said slide joint.

4. A monitor system as recited in claim 1, further comprising:
   a. wherein said attachment between said upright and said monitor is an upper pivot allowing said monitor to pivot with respect to said upright; and
   b. an upper pivot lock for locking said upper pivot in a desired position.

5. A monitor system as recited in claim 1, wherein said upright includes a dogleg offset.

6. A monitor as recited in claim 1, wherein said communications means comprises a cable.

7. A monitor as recited in claim 1, wherein said communications means comprises a wireless transmitter and a wireless receiver.

8. A monitor as recited in claim 1, wherein said camera mounting means includes a strap allowing said user to hold said camera using a hand of said user.

9. A monitor as recited in claim 1, wherein:
   a. said camera mounting means includes
      i. an elevation drive for adjusting the elevation of said video camera;
      ii. a pan drive for adjusting the rotation of said video camera about a vertical axis;
   b. said monitor includes
      i. an elevation control for activating said elevation drive; and
      ii. a pan control for activating said pan drive.

10. A monitor as recited in claim 1, wherein:
    a. said video camera includes a zoom drive; and
    b. said monitor includes a zoom control for activating said zoom drive.

11. A monitor as recited in claim 1, wherein:
    a. said camera mounting means includes a pitch drive; and
    b. said monitor includes a pitch control for activating said pitch drive.

12. A monitor system allowing a user to observe himself or herself while seated in a chair having a base and a seat pivotally attached to said base, comprising:
    a. a video camera;
    b. camera mounting means for fixing the location and orientation of said video camera, so that said video camera can be pointed toward said user when said user is sitting on said seat;
    c. a monitor, including
       i. communications means for receiving a video signal from said video camera;
       ii. display means for displaying said video signal as a visible image;
    d. monitor mounting means, configured to attach said monitor to said chair, so that said monitor pivots in unison with said seat;
    e. a second video camera is mounted on said monitor and directed toward said user; and
    f. said visible image on said monitor assumes the form of a split screen, with a first portion displaying the output of said video camera and a second portion displaying the output of said second video camera.

13. A monitor system as recited in claim 2, further comprising:
    a. a slide joint within said upright for adjusting the length of said upright; and
    b. a slide joint lock for locking said slide joint.

14. A monitor system as recited in claim 2, further comprising:
    a. wherein said attachment between said upright and said monitor is an upper pivot allowing said monitor to pivot with respect to said upright; and
    b. an upper pivot lock for locking said upper pivot in a desired position.

15. A monitor system as recited in claim 3, further comprising:
    a. wherein said attachment between said upright and said monitor is an upper pivot allowing said monitor to pivot with respect to said upright; and
    b. an upper pivot lock for locking said upper pivot in a desired position.

16. A monitor system as recited in claim 1, wherein said monitor is detachable from said monitor mounting means.

17. A monitor system as recited in claim 16, wherein said monitor includes a handle allowing said user to easily hold said monitor.

18. A monitor system as recited in claim 2, wherein said upright includes a dogleg offset.

19. A monitor system as recited in claim 3, wherein said upright includes a dogleg offset.

20. A monitor system allowing a user to observe himself or herself while seated in a chair having a base and a seat pivotally attached to said base, comprising:
    a. a video camera;
    b. camera mounting means for fixing the location and orientation of said video camera, so that said video camera can be pointed toward said user when said user is sitting on said seat;
    c. a monitor, including
       i. communications means for receiving a video signal from said video camera;
       ii. display means for displaying said video signal as a visible image; and
    d. monitor mounting means, configured to attach said monitor to said chair, so that said monitor pivots in unison with said seat without moving said video camera.

* * * * *